March 23, 1965 H. W. LA BRANCHE ETAL 3,174,178
KNOB MOUNTING
Filed Feb. 8, 1963
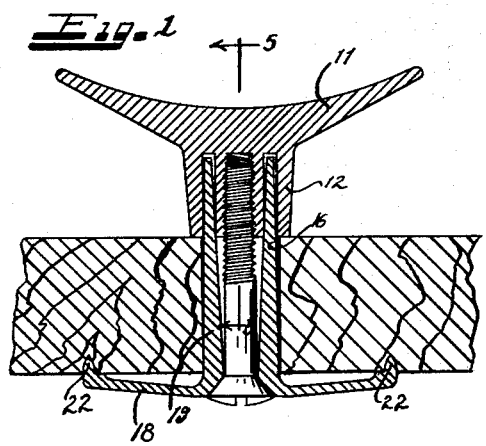
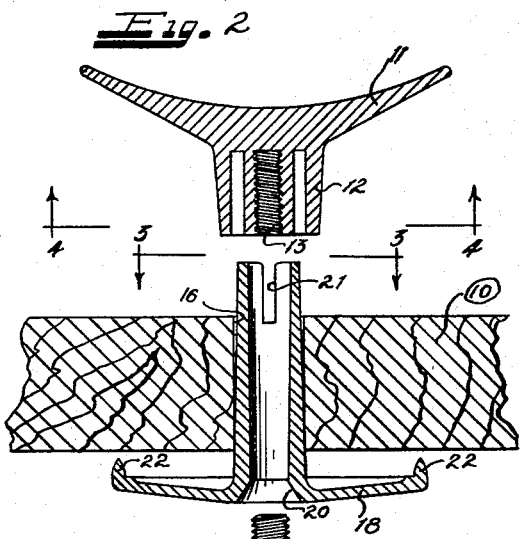
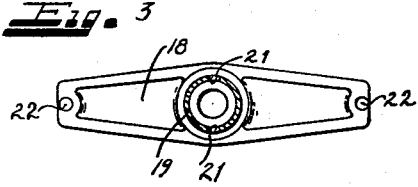
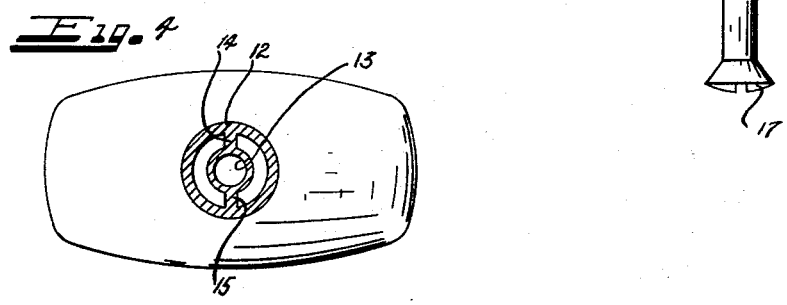
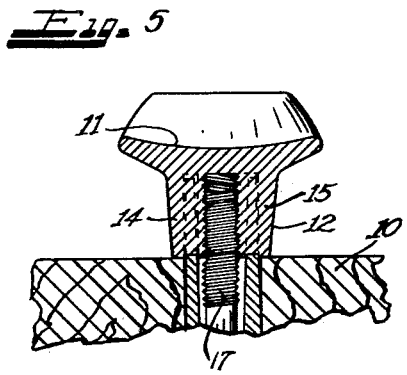
INVENTOR
HARVEY W. LaBRANCHE
JOHN C. DIMMER
By
Atty

United States Patent Office 3,174,178
Patented Mar. 23, 1965

3,174,178
KNOB MOUNTING
Harvey Wesley La Branche, Niles, Ill., and John C. Dimmer, Tacoma, Wash., assignors to Ekco Products Company, Chicago, Ill., a corporation of Delaware
Filed Feb. 8, 1963, Ser. No. 257,201
2 Claims. (Cl. 16—121)

The present invention relates to a knob mounting for doors, drawers or the like.

It is an object of this invention to provide a rigid non-turning knob mounting suitable for use as a door pull, a drawer pull or the like.

It is also an object of this invention to provide a knob mounting of the type indicated which incorporates features of design and construction which permits its manufacture at relatively low cost and also facilitates assembly or disassembly by the user, as needed.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size and minor details of structure may be made without departing from the spirit or sacrificing any of the advantages of the invention.

In the accompanying drawings:

FIG. 1 is a sectional view illustrating a knob mounting embodying the features of this invention.

FIG. 2 is a similar view showing the various elements of the knob mounting preparatory to operative assembly.

FIG. 3 is an end elevational view taken along line 3—3 of FIG. 2.

FIG. 4 is a sectional view taken along line 4—4 of FIG. 2.

FIG. 5 is a sectional view taken along line 5—5 of FIG. 2.

A knob mounting embodying the features of this invention is shown in the drawings as applied to the front wall or panel 10 of a conventional cabinet drawer.

In the present embodiment, the knob includes a head portion 11 of suitable design and a rearwardly projecting tubular extension defining a shank 12. The recess defined by the rearward end portion of the shank is divided along lines extending axially of the shank by an internally threaded reduced center core section 13 and a pair of wings 14 and 15 bridging the spaces between the wall of the shank 12 and the core section 13 along a line extending diametrically of the recess defined by the shank 12.

Front and rear faces of the panel 10 are joined by a passageway 16 through which a head screw 17 is inserted from rear to front to establish threaded connection with the threaded core section 13 of knob 11. Tightening of the screw 17 into said section 13 of the knob 11 is effective to draw a rear plate or locking member 18 into biting engagement with the rear surface of the panel 10 adjoining the passageway 16. As shown in FIG. 1, the plate 18 includes a forwardly extending tubular extension 19 to which the screw 17 has entrance via a central opening 20 in the plate 18. The extension 19 is provided with slots 21 into which the wings 14 and 15 of the knob shank 12 are rearwardly drawn under forward pressure of the head of the screw 17 against the surface of the plate surrounding the opening 20 incident to tightening of the screw 17. The interlocked engagement thus established between the knob and the rear plate via said wings 14 and 15 and the slots 21 is effective to prevent rotation of the knob 10 out of a selected rotated position about said screw 17 as an axis. The rear plate is provided with forwardly projecting spurs 22 which are embedded into the surface of the panel 10 opposite thereto so as to positively hold the plate against rotation about the screw 17 as an axis when the screw 17 is fully tightened in the threaded core section of the knob. It will be noted that the spurs 22 occupy positions in such outlying relation to an area within the confines of a rearward axial projection of the shank of the knob as to give maximum resistance to any torsional stress applied thereto by turning force exerted on the head portion 11 of the knob.

What is claimed:

1. A knob mounting for installation on a support having front and rear surfaces and an opening forming a passageway between said surfaces, said mounting including a knob having a rearwardly extending tubular shank adapted to have rearward engagement with the front surface of said support about said opening in the support, a locking member adapted to have forward engagement with the rear surface of said support about said opening in the support, said locking member having an opening defined by a forwardly extending tubular stem of such dimension as to project through said opening and to be telescoped by said shank of the knob when said locking member and said knob are in operatively mounted relation to said support, said shank of the knob having an integral internally threaded tubular core surrounded by the forward end portion of the stem of the locking member when said locking member and knob are in operative mounted relation, a screw receivable by said stem and having threaded engagement with said threaded tubular section of the shank of the knob, an abutment surface on said screw having forward engagement with the rearwardly facing surface of said locking member about said opening in the latter whereby the shank of the knob and said locking member are forced into engagement with the surfaces of the support opposite thereto as the screw is tightened in said tubular section of the shank of the knob, spurs formed integrally with said locking member having engagement with the rear surface of said support to secure said locking member in fixed rotated position relative to said support about said stem as an axis and occupying positions radially outside an area within the confines of a rearward axial projection of the shank of the knob, said stem of the locking member and a portion of the shank of the knob telescoped by said stem having interengaging means effective to prevent rotation of the knob relative to the locking member about said stem as an axis.

2. A knob mounting in accordance with claim 1, wherein said interengaging means include slots provided in the stem of the locking member, and wings extending radially from said tubular core of the shank telescoped by said stem.

References Cited in the file of this patent
UNITED STATES PATENTS

| 745,404 | Tower | Dec. 1, 1903 |
| 843,720 | Tower et al. | Feb. 12, 1907 |
| 2,190,192 | Raymond | Feb. 13, 1940 |
| 2,796,627 | Heyer | June 25, 1957 |
| 3,000,047 | Hill | Sept. 19, 1961 |

FOREIGN PATENTS

| 688,786 | France | May 19, 1930 |